United States Patent
Kim et al.

(10) Patent No.: US 9,435,230 B2
(45) Date of Patent: Sep. 6, 2016

(54) FUEL CELL HYBRID SYSTEM
(71) Applicant: Posco Energy Co., Ltd., Seoul (KR)
(72) Inventors: Min Ki Kim, Seoul (KR); Yin Jeong Cho, Gyeongsangbuk-do (KR); Sang Hoon Lee, Seoul (KR)
(73) Assignee: Posco Energy Co., Ltd. (KR)
( * ) Notice: Subject to any disclaimer, the term of this patent is extended or adjusted under 35 U.S.C. 154(b) by 179 days.
(21) Appl. No.: 14/368,855
(22) PCT Filed: Dec. 21, 2012
(86) PCT No.: PCT/KR2012/011217
§ 371 (c)(1),
(2) Date: Jun. 26, 2014
(87) PCT Pub. No.: WO2013/100490
PCT Pub. Date: Jul. 4, 2013
(65) Prior Publication Data
US 2014/0352309 A1 Dec. 4, 2014
(30) Foreign Application Priority Data
Dec. 27, 2011 (KR) .................. 10-2011-0143879
(51) Int. Cl.
*F01K 25/00* (2006.01)
*F01K 27/02* (2006.01)
(Continued)
(52) U.S. Cl.
CPC .............. *F01K 27/02* (2013.01); *F01K 25/08* (2013.01); *F02C 1/04* (2013.01); *F02C 6/18* (2013.01);
(Continued)
(58) Field of Classification Search
None
See application file for complete search history.

(56) References Cited

U.S. PATENT DOCUMENTS 4,041,210 A * 8/1977 Van Dine ............ H01M 8/0612
429/415

4,522,894 A * 6/1985 Hwang ................ C01B 3/48
429/425

(Continued)

FOREIGN PATENT DOCUMENTS

JP H10-21945 A 1/1998
JP 2003518710 A 6/2003
(Continued)

OTHER PUBLICATIONS

Steinfeld, G. et al, "High Efficiency Carbonate Fuel Cell/Turbine Hybrid Power Cycle." Energy Conversion Engineering Conference, 1996, IECEC 96., Proceedings of the 31st Intersociety, pp. 1123-1127, vol. 2, Aug. 11-16, 1996.

(Continued)

*Primary Examiner* — Jesse Bogue
(74) *Attorney, Agent, or Firm* — Lerner, David, Littenberg, Krumholz & Mentlik, LLP

(57) ABSTRACT

Provided is a fuel cell hybrid system. The fuel cell hybrid system includes a heat engine including a compression unit for compressing an oxidizer supply gas including air and an expansion unit for expanding the oxidizer supply gas to generate mechanical energy, a fuel cell including an anode for receiving a fuel gas, a cathode for receiving the oxidizer supply gas, and a catalytic combustor for burning a non-reaction fuel gas of an anode exhaust gas exhausted from the anode to heat the oxidizer supply gas, a first heat exchanger heat-exchanging the oxidizer supply gas discharged from the compression unit with a cathode exhaust gas exhausted from the cathode, and a second heat exchanger heat-exchanging the oxidizer supply gas discharged from the first heat exchanger with the oxidizer supply gas discharged from the catalytic combustor. The oxidizer supply gas discharged from the second heat exchanger is supplied into the catalytic combustor via the expansion unit, and the oxidizer supply gas discharged from the catalytic combustor is supplied into the cathode via the second heat exchanger.

10 Claims, 3 Drawing Sheets

(51) Int. Cl.
*H01M 8/04* (2016.01)
*F02C 1/04* (2006.01)
*F02C 6/18* (2006.01)
*F01K 25/08* (2006.01)
*H01M 8/06* (2016.01)
*H01M 8/14* (2006.01)

(52) U.S. Cl.
CPC ..... *H01M 8/04014* (2013.01); *H01M 8/04022* (2013.01); *H01M 8/04089* (2013.01); *H01M 8/04097* (2013.01); *H01M 8/04111* (2013.01); *H01M 8/0618* (2013.01); *H01M 2008/147* (2013.01); *Y02E 60/50* (2013.01); *Y02E 60/526* (2013.01)

(56) References Cited

U.S. PATENT DOCUMENTS

| | | | | |
|---|---|---|---|---|
| 4,865,926 | A * | 9/1989 | Levy | H01M 8/04 429/425 |
| 6,365,290 | B1 | 4/2002 | Ghezel-Ayagh et al. | |
| 2004/0040281 | A1* | 3/2004 | Yamaguchi | H01M 8/0612 60/274 |
| 2006/0010872 | A1* | 1/2006 | Singh | C09K 5/045 60/671 |
| 2006/0099469 | A1* | 5/2006 | Meltser | H01M 8/04029 429/434 |
| 2008/0070078 | A1* | 3/2008 | Gummalla | B64D 41/00 429/410 |
| 2008/0187789 | A1* | 8/2008 | Ghezel-Ayagh | F02C 1/007 429/414 |
| 2010/0104903 | A1* | 4/2010 | Gummalla | C01B 3/12 429/420 |
| 2011/0223500 | A1* | 9/2011 | Uematsu | H01M 8/04014 429/415 |
| 2012/0067055 | A1* | 3/2012 | Held | F02C 7/12 60/772 |
| 2013/0029235 | A1* | 1/2013 | Kiyohiro | H01M 8/04014 429/414 |

FOREIGN PATENT DOCUMENTS

| | | |
|---|---|---|
| JP | 2003-323909 A | 11/2003 |
| JP | 2003-331893 A | 11/2003 |
| JP | 2008008224 A | 1/2008 |
| JP | 2010-071091 A | 4/2010 |
| JP | 2011-228182 A | 11/2011 |
| KR | 100651270 B1 | 11/2006 |
| KR | 20070042183 A | 4/2007 |
| KR | 20090108123 A | 10/2009 |
| KR | 20110032532 A | 3/2011 |
| WO | 01/47048 A1 | 6/2001 |
| WO | 2010/058749 A1 | 5/2010 |

OTHER PUBLICATIONS

Search report from European Application No. 12863106.6, dated Apr. 15, 2015.
International Search Report for Application No. PCT/KR2012/011217 dated Apr. 16, 2013.

* cited by examiner

FUEL CELL HYBRID SYSTEM

CROSS REFERENCE TO RELATED APPLICATIONS

The present application is a national phase entry under 35 U.S.C. §371 of International Application No. PCT/KR2012/011217 filed Dec. 21, 2012, published in Korean, which claims priority from Korean Patent Application 10-2011-0143879 filed Dec. 27, 2011, all of which are incorporated herein by reference.

TECHNICAL FIELD

The present invention relates to a fuel cell hybrid system, and more particularly, to a fuel cell hybrid system that links a fuel cell with a heat engine or linking the fuel cell with an organic rankine cycle device as well as the heat engine to improve efficiency of the entire system.

BACKGROUND ART

Fuel cells are units for directly converting chemical energy stored in hydrocarbon fuel into electric energy through an electrochemical reaction. That is, fuel cells are units for directly converting chemical energy into electric energy through a hydrogen oxidation reaction in an anode and an oxidation reduction reaction in a cathode. For these reactions, a fuel gas (hydrogen) has to be supplied into an anode of a fuel cell stack, and air (oxygen) has to be supplied into a cathode of the fuel cell stack. A fuel cell system for producing electricity through above-described reactions may include a fuel cell stack, a mechanical balance of plant (MBOP), and an electrical balance of plant (EBOP). The fuel cell stack may be a unit for producing electricity through the electrochemical reaction, the MBOP may be a unit for supplying oxygen and hydrogen into the fuel cell stack, and the EBOP may be a unit for converting a DC power applied into the fuel cell stack into an AC power through an inverter to supply the converted AC power to desired units.

High-temperature fuel cells such as molten carbonate fuel cells (MCFCs) may produce electricity through following processes. Referring to FIG. 3, a fuel gas such as a natural gas generally contact sulfur (S). The sulfur (S) may have a bad influence on a reforming catalyst of a reformer 20 that will be described later. Thus, the fuel gas has to be desulfurized first through a desulfurizer (not shown). Also, a reforming reaction occurring in the reformer 20 requires water. Thus, since liquid water may damage the reforming catalyst, gaseous water together with the fuel gas has to be supplied into the reformer 20. Thus, the fuel gas may be humidified while passing through a humidifying heat exchanger. The humidifying heat exchanger 10 may evaporate liquid water by using a high-temperature cathode exhaust gas that is exhausted from a cathode 44 of a fuel call stack. As a result, the desulfurized and humidified fuel gas may be reformed into hydrogen in a pre-reformer 20. The hydrogen may be heated to a required temperature through heat-exchange in a heat exchanger 30. Then, the hydrogen is supplied into an anode 42 of the fuel cell stack.

Also, as described above, air (oxygen) has to be supplied into the cathode 44 of the fuel cell stack. For this, the fuel cell may generally supply an oxidizer supply gas from an air source such as the atmosphere into the cathode 44. Here, the oxidizer supply gas may be air. In some cases, the oxidizer supply gas may be a gas in which a portion of a cathode exhaust gas is recycled and then mixed with air. However, the oxidizer supply gas is needed to be heated to an adequate temperature so as to be supplied into the cathode 44. To heat the oxidizer supply gas, a catalytic combustor 50 for burning a non-reaction fuel gas of an anode exhaust gas to heat the oxidizer supply gas may be used. The heated oxidizer supply gas may be supplied into the cathode 44 of the fuel cell stack.

However, MCFCs that produce electricity through the above-described processes may generate heat in addition to the electricity. Thus, in a fuel cell system using high-temperature fuel cells such as the MCFCs, efficiency of the entire system may vary according to a use method of the heat. As a result, methods for utilizing the heat are being variously taken to improve the efficiency of the entire system. For example, a method in which the heat is used as heating source is being attempted. However, for utilizing the heat as the heating source, the fuel cell system has to be installed in a place that is not far away from a place at which the heating source is needed.

To overcome the foregoing limitation, methods for utilizing the heat in a heat engine (for example, a gas turbine) or an organic rankine cycle (ORC) device are being taken. Here, the heat engine may represent a device for converting heat energy into mechanical energy, and the ORC device may represent a device that recovers waste heat having low to medium temperatures for power generation to operate a turbine. However, in the foregoing methods, when the fuel cell and the heat engine are liked with each other, or the fuel cell and the organic rankine cycle device are linked with other, it may be difficult to efficiently utilize the heat produced from the fuel cell.

DISCLOSURE OF THE INVENTION

Technical Problem

Thus, to solve the foregoing limitation, the prevent invention provides a fuel cell hybrid system that links a fuel cell with a heat engine or linking the fuel cell with an organic rankine cycle device as well as the heat engine to efficiently utilize heat produced from the fuel cell.

Technical Solution

According to an aspect of the present invention, there is a fuel cell hybrid system including: a heat engine comprising a compression unit for compressing an oxidizer supply gas including air and an expansion unit for expanding the oxidizer supply gas to generate mechanical energy; a fuel cell including an anode for receiving a fuel gas, a cathode for receiving the oxidizer supply gas, and a catalytic combustor for burning a non-reaction fuel gas of an anode exhaust gas exhausted from the anode to heat the oxidizer supply gas; a first heat exchanger heat-exchanging the oxidizer supply gas discharged from the compression unit with a cathode exhaust gas exhausted from the cathode; and a second heat exchanger heat-exchanging the oxidizer supply gas discharged from the first heat exchanger with the oxidizer supply gas discharged from the catalytic combustor, wherein the oxidizer supply gas discharged from the second heat exchanger is supplied into the catalytic combustor via the expansion unit, and the oxidizer supply gas discharged from the catalytic combustor is supplied into the cathode via the second heat exchanger.

Advantageous Effects

In the fuel cell hybrid system according to the present invention, since the heat of the oxidizer supply gas discharged from the catalytic combustor as well as the heat of the cathode exhaust gas exhausted from the cathode are transferred into the heat engine, heat required for the heat engine may be sufficiently secured, and also the heat generated from the fuel cell may be utilized without waste. Furthermore, since the residual heat after being transferred into the heat engine may also be transferred into the organic rankine cycle device, the efficiency of the entire system may be more improved.

MODE FOR CARRYING OUT THE INVENTION

Preferred embodiments of the present invention will be described below in more detail with reference to the accompanying drawings. However, the present invention is not limited to the embodiments below.

Figure 1:
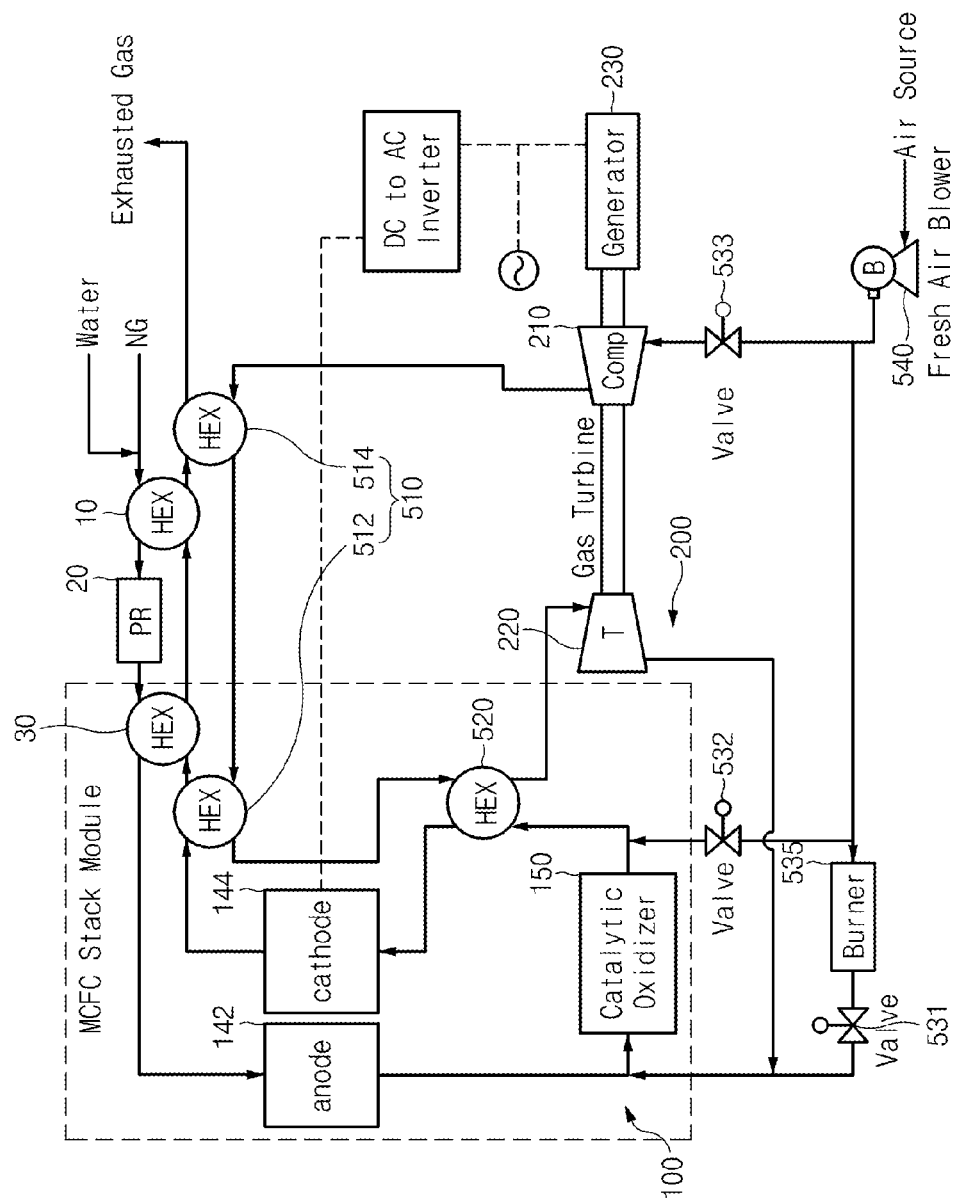
FIG. 1 is a block diagram of a fuel cell hybrid system according to an embodiment of the present invention.

FIG. 1 is a block diagram of a fuel cell hybrid system according to an embodiment of the present invention. Referring to FIG. 1, a hybrid system according to the current embodiment includes a fuel cell 100 and a heat engine 200. First, explaining the heat engine 200, the heat engine 200 according to the current embodiment includes a compression unit 210 and an expansion unit 220. The compression unit 210 may receive an oxidizer supply gas from an air source such as the atmosphere to compress the oxidizer supply gas. For reference, the compression unit 210 according to the current embodiment may be a general compressor for compressing a gas.

The compressed oxidizer supply gas may be heated through a first heat exchanger 510. For this, the first heat exchanger 510 may heat-exchange the oxidizer supply gas exhausted from the compression unit 210 with a cathode exhaust gas exhausted from a cathode 144 to heat the oxidizer supply gas. Since the cathode exhaust gas has a very high temperature, it may be sufficient to heat the oxidizer supply gas. However, the first heat exchanger 510 may include a first internal heat exchanger 512 and a first external heat exchanger 514. The first internal heat exchanger 512 may be a heat exchanger provided in a stack module constituting the fuel cell 100, and the first external heat exchanger 514 may be a heat exchanger provided outside the stack module. As described above, if the heat exchangers are provided inside and outside the stack module, heat-exchange efficiency in the stack module may be improved.

The oxidizer supply gas heated through the first heat exchanger 510 may be further heated through the second heat exchanger 520. The second heat exchanger 520 may heat-exchange the oxidizer supply gas discharged from the first heat exchanger 510 with the oxidizer supply gas discharged from a catalytic combustor 150 to further heat the oxidizer supply gas that passes through the first heat exchanger 510. As described above, the catalytic combustor 150 may burn a non-reaction fuel gas of an anode exhaust gas exhausted from an anode 142 to heat the oxidizer supply gas. Thus, the oxidizer supply gas discharged from the catalytic combustor 150 may have a sufficient temperature for heating the oxidizer supply gas discharged from the first heat exchanger 510.

The high-temperature high-pressure oxidizer supply gas that is compressed and heated may be expanded in the expansion unit 220 to generate mechanical energy. The expansion unit 220 may be an expansion turbine in which a high-temperature high-pressure gas is expanded to rotate a turbine, thereby generating mechanical energy. The mechanical energy generated in the expansion unit 220 may be used in a generator 230 as well as the compression unit 210. When the mechanical energy generated in the expansion unit 220 operates the generator 230, the heat engine 200 as well as the fuel cell 100 may produce electricity.

As described above, in the hybrid system according to the current embodiment, the heat produced in the fuel cell 100 may be utilized in the heat engine 200 to improve efficiency of the entire system. Furthermore, in the hybrid system according to the current embodiment, the heat (see the second heat exchanger 520) of the oxidizer supply gas discharged from the catalytic combustor 150 as well as the heat (see the first heat exchanger 510) of the cathode exhaust gas exhausted from the cathode may be transferred into the heat engine 200. Thus, heat required for the heat engine 200 may be sufficiently secured, and the heat produced from the fuel cell 100 may be utilized without waste to improve the efficiency of the entire system.

The oxidizer supply gas discharged from the expansion unit 220 is supplied into the catalytic combustor 150. However, if only the oxidizer supply gas passing through the heat engine 200 is supplied into the catalytic combustor 150, it may be difficult to supply a sufficient amount of oxidizer supply gas into the cathode 144. This is done because an amount of oxidizer supply gas required for producing the mechanical energy in the heat engine 200 may be different from that of oxidizer supply gas required for producing electricity in the fuel cell 100. To solve the above-described limitation, as illustrated in FIG. 1, the hybrid system according to the current embodiment may supply the oxidizer supply gas from the air source into the catalytic combustor 150 as well as the compression unit 210. As a result, selectively, in addition to the supply of the oxidizer supply gas into the catalytic combustor 150 via the heat engine, the oxidizer supply gas may be directly supplied from the air source into the catalytic combustor 150.

Here, to adjust an amount of oxidizer supply gas supplied from the air source into the catalytic combustor 150, the hybrid system according to the current embodiment may further include a first adjusting valve 531. Also, to heat the oxidizer supply gas from the air source into the catalytic combustor 150, the hybrid system according to the current embodiment may further include a burner 535. When the fuel call 100 starts in operation, or a load applied to the fuel cell 100 is below about 50%, a sufficient reaction may not occur in the fuel cell 100. Thus, it may be difficult to maintain a temperate required for operating the fuel cell 100. Thus, required heat may be separately supplied. For this, the hybrid system according to the current embodiment may use the above-described burner 535. As described above, when the oxidizer supply gas is heated through the burner 535 to supply the heated oxidizer supply gas into the catalytic combustor 150, the fuel cell 100 may be maintained to a required temperature by using the heat of the oxidizer supply gas even though it is difficult to maintain the required temperature by using only the fuel cell 100.

The hybrid system according to the current embodiment may also supply the oxidizer supply gas from the air source into the oxidizer supply gas discharged from the catalytic combustor 150 as well as the compressor unit 210. As described above, since the oxidizer supply gas is heated while passing through the catalytic combustor 150, the oxidizer supply gas may have a temperature greater than that of the oxidizer supply gas supplied from the air source. Thus, when the oxidizer supply gas supplied from the air source is supplied into the oxidizer supply gas discharged from the catalytic combustor 150, the oxidizer supply gas discharged from the catalytic combustor 150 may decrease in temperature. Thus, if an amount of oxidizer supply gas supplied from the air source is adjusted, the oxidizer supply gas discharged from the catalytic combustor 150 may be adjusted in temperature.

For example, in a state where the fuel cell stack increases in temperature due to a high load, when an amount of oxidizer supply gas supplied from the air source increases to reduce a temperature of the oxidizer supply gas (i.e., the oxidizer supply gas discharged from the catalytic combustor) supplied into the cathode 144, the fuel cell stack may be reduced in temperature. Since it is necessary to maintain the fuel cell stack at a constant temperature, the adjustment in temperature of the fuel cell stack may be vary useful. The hybrid system according to the current embodiment may further include a second adjusting valve 532 as illustrated in FIG. 1 so as to adjust a temperature, i.e., a flow rate of oxidizer supply gas supplied into the oxidizer supply gas discharged from the catalytic combustor 150.

Also, the hybrid system according to the current embodiment may further include a third adjusting valve 533 for adjusting a flow rate of oxidizer supply gas supplied from the air source into the compression unit 210 in addition to the above-described first and second valves 531 and 532. Since the third adjusting valve 533 may consequentially adjust an amount of oxidizer supply gas introduced into the expansion unit 220, an amount of mechanic energy produced from the heat engine 200 may be adjustable. As a result, the hybrid system according to the current embodiment may adjust an amount of oxidizer supply gas that is required for the heat engine 200, an amount of oxidizer supply gas that is required for the fuel cell 100, and an amount of oxidizer supply gas that is required for adjusting a temperature of the fuel cell stack through the three valves 531, 532, and 533. For reference, to supply the oxidizer supply gas from the air source into the fuel cell 100 or the heat engine 200, the hybrid system according to the current embodiment may further include an air blower 540.

Figure 2:
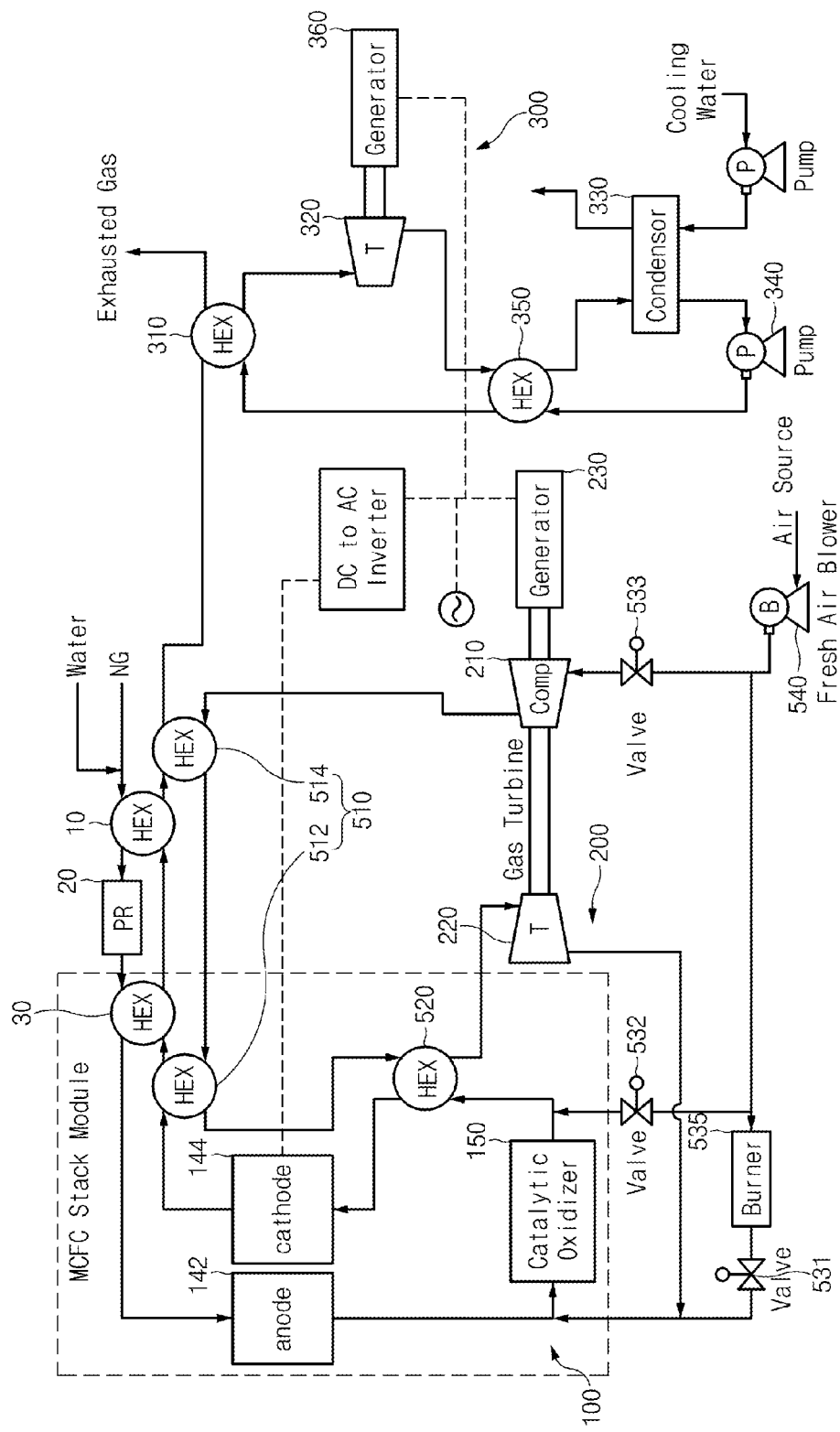
FIG. 2 is a block diagram of a fuel cell hybrid system according to another embodiment of the present invention.

The cathode exhaust gas exhausted from the cathode 144 may be maintained somewhat at a high temperature after the heat is provided into the heat engine 200. Thus, if the heat is further utilized, the efficiency of the entire system may be further improved. For this, as illustrated in FIG. 2, the hybrid system according to the current embodiment may further include an organic rankine cycle (ORC) device 300 that recovers waste heat having low to medium temperatures for power generation to operate a turbine. FIG. 2 is a block diagram of a fuel cell hybrid system according to another embodiment of the present invention. Referring to FIG. 2, an ORC device 300 according to the current embodiment includes a third heat exchanger 310 for heat-exchanging a cathode exhaust gas discharged from a first heat exchanger 510 with a working fluid to heat the working fluid, an expansion turbine 320 expanding the working fluid heated through the third heat exchanger 310 to generate mechanical energy, a condenser 330 condensing the working fluid discharged from the expansion turbine 320, and a pump 340 forcibly transferring the working fluid discharged from the condenser 330.

The expansion turbine 320 may operate a generator 360 by using the generated mechanical energy to produce electricity, like the above-described expansion unit 220. Also, the condenser 330 may receive cold water from the outside to condense the working fluid. Also, the ORC device 300 according to the current embodiment may further include a fourth heat exchanger 350 for heat-exchanging the working fluid discharged from the pump 340 with the working fluid discharged from the expansion turbine 320 to further improve heat-exchange efficiency. For reference, the ORC device 300 may use an organic medium having relatively low boiling point and relatively high steam pressure than those of water as a working fluid.

As described above, the fuel cell hybrid system according to the current embodiment may also produce electricity through a heat engine 200 and the ORC device 300 as well as the fuel cell 100. Also, heat required for the heat engine 200 and the ORC device 300 may be supplied from the fuel cell 100. Thus, the hybrid system according to the current embodiment may be installed anywhere and improved in efficiency. In detail, the hybrid system (see FIG. 2) according to the current embodiment may utilize the waste heat generated from the fuel cell 100 in the ORC device 300 as well as the heat engine 200. Thus, as shown in Table 1 below, the hybrid system may have improved efficiency when compared to the system (see FIG. 3) including only the fuel cell according to the related art (Table 1 below shows data obtained under a rated output).

TABLE 1

Figure 3:
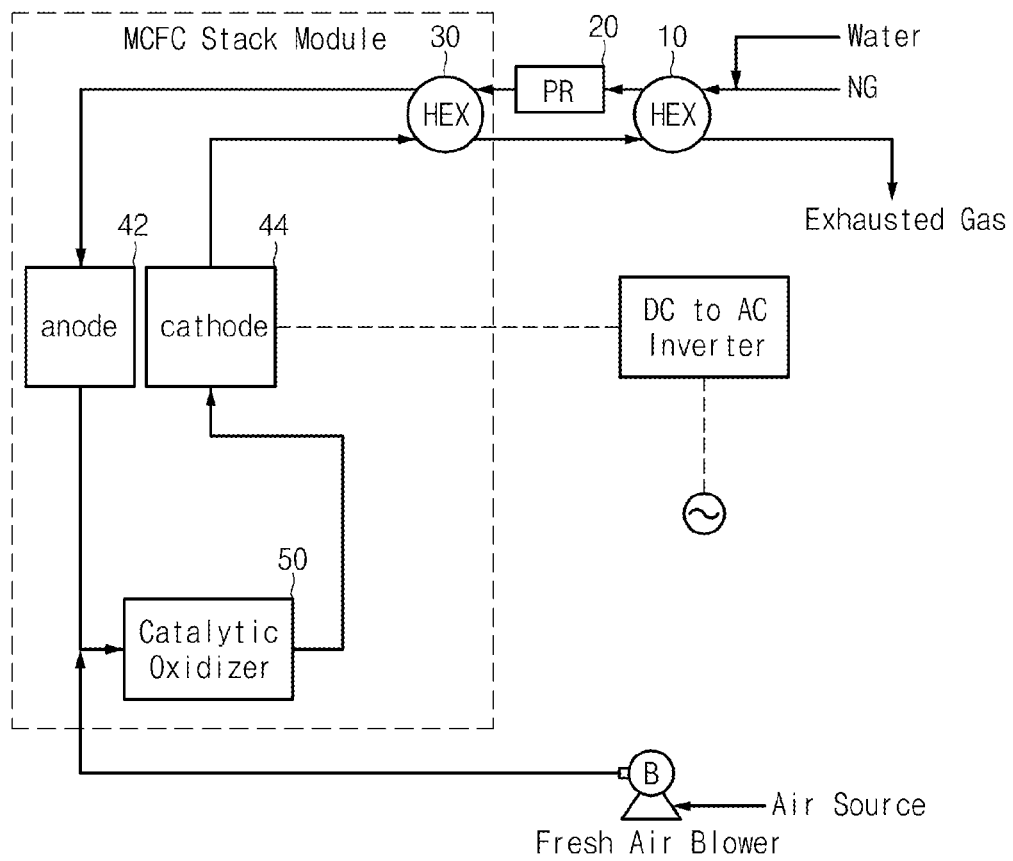
FIG. 3 is a block diagram illustrating basic constitutions of a molten carbonate fuel cell (MCFC).

| Classification | | System of FIG. 2 | System of FIG. 3 |
|---|---|---|---|
| Supply amount of natural gas [lb/hr] | | 961 | 961 |
| Fuel cell | DC [kW] | 3017 | 3017 |
| | AC [kW] | 2896 | 2896 |
| | Inverter loss (4%) [kW] | 121 | 121 |
| | MBOP loss [kW] | 19 | 99 |
| Heat engine | Compressor (efficiency 82.7%) Power consumption [kW] | 771 | |
| | Expansion turbine (efficiency 93%) Generated power [kW] | 1279 | |
| ORC device (15%) | Generated power [kW] | 145 | |
| Output of entire system [kW] | | 3533 | 2800 |
| Total electricity efficiency [%] | | about 59 | about 47 |

INDUSTRIAL APPLICABILITY

Since the present invention relates to the fuel cell hybrid system that links the fuel cell with the heat engine or linking the fuel cell with the organic rankine cycle device as well as the heat engine to improve the efficiency of the entire system, industrial applicability is high.

The invention claimed is:
1. A fuel cell hybrid system comprising:
a heat engine comprising a compression unit for compressing an oxidizer supply gas comprising air and an expansion unit for expanding the oxidizer supply gas to generate mechanical energy;
a fuel cell comprising an anode for receiving a fuel gas, a cathode for receiving the oxidizer supply gas, and a catalytic combustor for burning a non-reaction fuel gas of an anode exhaust gas exhausted from the anode to heat the oxidizer supply gas;

a first heat exchanger heat-exchanging the oxidizer supply gas discharged from the compression unit with a cathode exhaust gas exhausted from the cathode; and a second heat exchanger heat-exchanging the oxidizer supply gas discharged from the first heat exchanger with the oxidizer supply gas discharged from the catalytic combustor, wherein the oxidizer supply gas discharged from the first heat exchanger is supplied into the catalytic combustor via the second heat exchanger and the expansion unit, and the oxidizer supply gas discharged from the catalytic combustor is supplied into the cathode via the second heat exchanger, and selectively the oxidizer supply gas is directly supplied into the catalytic combustor from an air source for supplying the oxidizer supply gas, in addition to the supply of the oxidizer supply gas into the catalytic combustor from the air source via the heat engine.

2. The fuel cell hybrid system of claim 1, wherein the first heat exchanger comprises a first internal heat exchanger provided in a stack module constituting the fuel cell and a first external heat exchanger provided outside the stack module.

3. The fuel cell hybrid system of claim 1, further comprising a first adjusting valve for adjusting a flow rate of the oxidizer supply gas directly supplied from the air source into the catalytic combustor.

4. The fuel cell hybrid system of claim 1, further comprising a burner for heating the oxidizer supply gas directly supplied from the air source into the catalytic combustor.

5. The fuel cell hybrid system of claim 1, wherein selectively the oxidizer supply gas is directly supplied from the air source into the oxidizer supply gas discharged from the catalytic combustor, in addition to the supply of the oxidizer supply gas into the catalytic combustor from the air source via the heat engine.

6. The fuel cell hybrid system of claim 5, further comprising a second adjusting valve for adjusting a flow rate of the oxidizer supply gas directly supplied from the air source into the oxidizer supply gas that is discharged from the catalytic combustor.

7. The fuel cell hybrid system of claim 1, further comprising a third adjusting valve for adjusting a flow rate of the oxidizer supply gas supplied from the air source into the compression unit.

8. The fuel cell hybrid system of claim 1, further comprising an organic rankine cycle device comprising a third heat exchanger for heat-exchanging a cathode exhaust gas discharged from the first heat exchanger with a working fluid to heat the working fluid, an expansion turbine for expanding the working fluid heated through the third heat exchanger to generate mechanical energy, a condenser for condensing the working fluid discharged from the expansion turbine, and a pump forcibly transferring the working fluid discharged from the condenser.

9. The fuel cell hybrid system of claim 8, wherein the organic rankine cycle device further comprises a fourth heat exchanger for heat-exchanging the working fluid discharged from the pump with the working fluid discharged from the expansion turbine.

10. The fuel cell hybrid system of claim 5, further comprising a third adjusting valve for adjusting a flow rate of the oxidizer supply gas supplied from the air source into the compression unit.

* * * * *